(12) United States Patent
Wilber

(10) Patent No.: US 6,400,409 B1
(45) Date of Patent: Jun. 4, 2002

(54) CONTROL OF HORIZONTAL FREQUENCY SELECTION

(75) Inventor: James Albert Wilber, Indianapolis, IN (US)

(73) Assignee: Thomson Licensing SA, Boulogne Cedex (FR)

( * ) Notice: Subject to any disclaimer, the term of this patent is extended or adjusted under 35 U.S.C. 154(b) by 0 days.

(21) Appl. No.: 09/130,958

(22) Filed: Aug. 7, 1998

(51) Int. Cl.$^7$ .............................. H04N 5/46; H04N 5/04
(52) U.S. Cl. .................. 348/543; 348/555; 348/542
(58) Field of Search ................ 348/555, 540, 348/524, 542, 543, 544, 530, 531; 331/4, 20; H04N 5/46, 5/04

(56) References Cited

U.S. PATENT DOCUMENTS

| | | | | |
|---|---|---|---|---|
| 5,541,556 A | * | 7/1996 | Francis | 348/543 |
| 6,009,006 A | * | 12/1999 | Fernsler | 348/542 |
| 6,229,401 B1 | * | 5/2001 | Wilber | 348/540 |
| 6,233,020 B1 | * | 5/2001 | Wilber | 348/542 |

\* cited by examiner

*Primary Examiner*—Sherrie Hsia
(74) *Attorney, Agent, or Firm*—Joseph S. Tripoli; Harvey D. Fried; Francis A. Davenport

(57) ABSTRACT

An apparatus displays pictures from sources having a plurality of horizontal frequencies. A scanning generator is operable at the plurality of frequencies and comprises an oscillator generating a signal. A divider with two selectable counts is coupled to the oscillator and divides the signal by a first count to generate a horizontal drive signal. A horizontal scanning amplifier generates a scanning signal responsive to the horizontal drive signal coupled thereto. A controller is coupled to the scanning amplifier and to the divider. In response to selecting another of the plurality of frequencies, the controller monitors the scanning signal and responsive to its presence inhibits selection of a second of the selectable counts. In the absence of the scanning signal the controller enables selection of the second of selectable counts and the divider generates a horizontal drive signal representative of the another one of the plurality of horizontal scanning frequencies.

12 Claims, 2 Drawing Sheets

CONTROL OF HORIZONTAL FREQUENCY SELECTION

This invention relates generally to the field of horizontal scanning systems for video apparatus and in particular to the control of systems operable at multiple horizontal scanning frequencies.

BACKGROUND

In a video display apparatus, scanning circuits are synchronized to a synchronizing component or sync derived from the input video signal. Hence, a video display apparatus which is operable at multiple horizontal scanning frequencies must be capable of synchronizing to a standard definition NTSC signal horizontal scanning frequency of nominally 15.734 kHz or to a high definition, Advanced Television Standards Committee, ATSC, signal having horizontal scanning frequency of nominally 33,670 kHz with 1080 active lines and interlaced scanning (1080I). In addition to synchronizing to broadcast video signals, the apparatus may be required to display computer generated non-broadcast video signals, such as, for example, a super video graphics adapter signal or SVGA, having a horizontal frequency of 37,880 kHz.

Horizontal frequency oscillators employing phase locked loop control are widely known and used in video display apparatus. Dual and triple phase locked loops are also known and used to provide functional separation between potentially conflicting requirements of synchronization and scanning waveform generation. In a dual loop configuration, a first loop may be a conventional phase locked loop in which a voltage controlled oscillator output, or an output divided therefrom is compared with horizontal synchronizing pulses derived from the video signal to be displayed. The second phase locked loop, which for example, operates at the same frequency, compares the oscillator output from the first loop with a horizontal rate pulse, for example, a retrace pulse voltage derived from or representative of deflection current flow. The error voltage from the second phase comparison is used to generate a width modulated pulse signal which determines the initiation of the deflection output device turn off, and subsequently, retrace initiation, or the phase of each line within the period of a vertical scan.

The response of the first phase locked loop may be optimized for fringe area reception of broadcast video signals suffering poor signal to noise ratios. Such signals suggest that the response of the first phase locked loop is relatively slow. Accordingly, the first loop may have a narrow bandwidth to optimize phase jitter reduction. However, since a video display apparatus required to be operable with signals from a variety sources and with differing horizontal frequencies. The response of the first phase locked loop represents a compromise between a narrow bandwidth for minimized phase jitter and a wide bandwidth, fast loop response capable of rapid phase recovery. For example, a narrow bandwidth loop is suited to synchronization by low noise, non-broadcast computer generated signals, whereas and wide bandwidth, fast loop response, capable of rapid phase recovery is required for synchronization of video cassette recorder (VCR) replay signals where abrupt changes in horizontal sync. pulse phase, by as much as 10 microseconds may occurring between the beginning and end of the vertical banking interval. Hence tradeoffs in respective loop responses may be made to provide adequate weak signal performance without significant overall degradation of receiver performance. The second phase locked loop generally has a faster loop response. Accordingly, the second phase locked loop may have a wider bandwidth allowing it to track variations in the deflection current due to horizontal output transistor storage time variations, or high voltage transformer tuning effects. Such tight tracking yields a straight, non-bending raster largely independent of beam current loading.

The use of voltage controlled oscillators for horizontal frequency signal generation is well known. It is known to employ an oscillator operating at a multiple of the input horizontal sync. frequency and to achieve synchronization by means of counters with a selectable counts. However, immediate scanning circuitry failure results when scanning frequency current is interrupted by count selection while scanning.

SUMMARY OF THE INVENTION

Scanning circuitry failure resulting from count selection while scanning is advantageously prevented by an inventive arrangement. A scanning generator operable at a plurality of horizontal scanning frequencies comprises an oscillator generating a signal. A divider with at least two selectable counts is coupled to the oscillator and divides the signal by a first count to generate a horizontal drive signal. A horizontal scanning amplifier generates a scanning signal responsive to the horizontal drive signal coupled thereto. A controller is coupled to the scanning amplifier and to the divider. In response to selection of another one of the plurality of horizontal scanning frequencies, the controller monitors the scanning signal and responsive to a presence the controller inhibits selecting a second of the least two selectable counts. In the absence of the scanning signal the controller enables selection of the second of the least two selectable counts and the divider generates a horizontal drive signal representative of the another one of the plurality of horizontal scanning frequencies.

DETAILED DESCRIPTION

Figure 1:
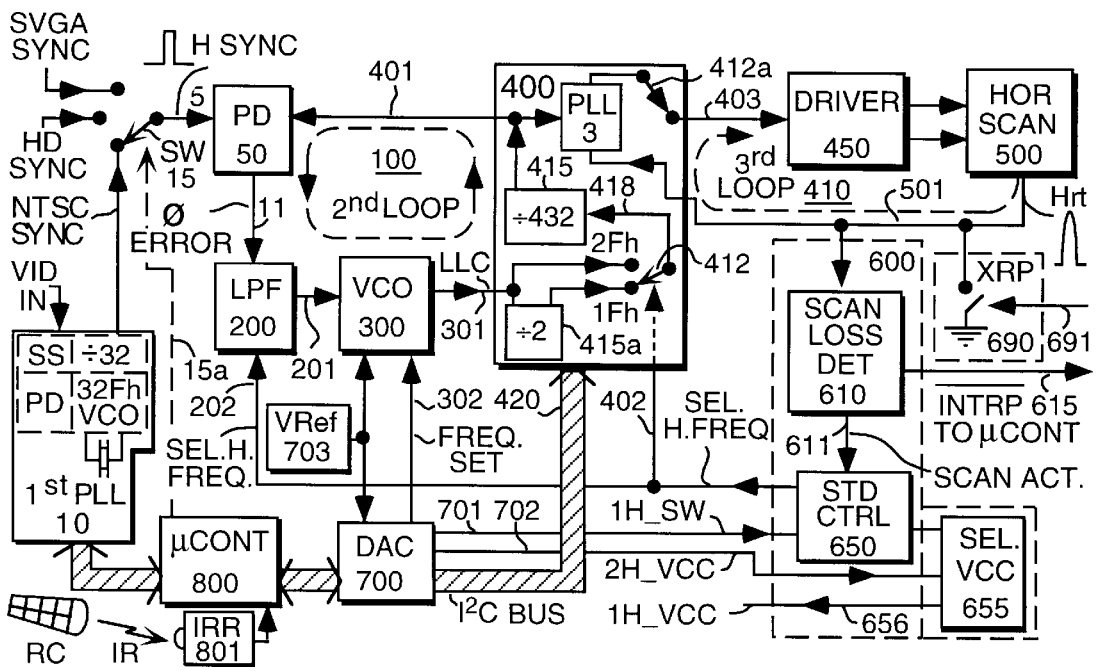
FIG. 1 is a block diagram of an exemplary horizontal frequency oscillator employing three phase locked loops with various inventive arrangements.

A horizontal frequency oscillator and deflection amplifier employing three phase locked loops and operable at a plurality of frequencies is shown in FIG. 1. In a first phase locked loop 10, an input video display signal, for example a standard definition NTSC signal is coupled to a sync separator, SS, where a horizontal synchronizing signal component is separated. A voltage controlled oscillator has a frequency of 32 times an NTSC horizontal frequency, 1 Fh, and is divided by 32 in a counter, depicted as, ÷32. The divided oscillator signal is coupled as one input to a phase detector PD, with the second input coupled to the separated sync component. The resulting phase error between the divided oscillator signal and the separated sync component is coupled from phase detector, PD, to synchronize the 32Fh voltage controlled oscillator. The functional elements of PLL 10, form part of a bus controlled integrated circuit, for example type TA1276. The standard definition horizontal sync component from PLL10 is coupled to a sync source selector switch SW15 which provides selection between a plurality of synchronizing signals coupled as input sources to synchronize second and third controlled horizontal oscillator loops, 100 and 410 respectively. Selector switch SW15 is depicted with three exemplary sync sources, namely a standard definition NTSC sync signal, a high definition sync signal, for example ATSC 1080I, and a computer generated SVGA sync signal, however, sync selection for horizontal oscillator synchronization signal is not limited to these examples. Sync switch SW15 is controlled by switching signal 15*a* which is generated by microcontroller 800 in response to a user control command, for example, as generated by a remote control transmitter RC, which communicates by wireless means to receiver IRR, 801 which input the remote control data to microcontroller 800. Remote control RC allows display signal source selection, for example, changing broadcast TV channels between HD and SD broadcasts or viewing a computer program with selectable display resolution.

The three phase locked oscillators depicted in FIG. 1 are advantageously controlled to provide optimized performance, to only with input signals of differing frequencies but also with signals subject to timing perturbations. During the display of NTSC signals, loops 10, 100 and 410 are utilized. However NTSC signals may originate from a broadcast source or a VCR. The latter source may be subject to sync phase perturbations, thus such signal disturbances are advantageous accommodated within PLL 100 by means of controlled selection of low pass filter characteristic. Selection of high definition signal inputs, for example ATSC or SVGA cause PLL10 to be bypassed reducing the sync system to two controlled loops, for example PLL100 and PLL410. Thus microcontroller 800 is required to control input video display selection responsive to user commands, to control sync source selection responsive to the display selection, control the oscillator frequency, the oscillator divider and phase locked oscillator low pass filter characteristics.

The selected synchronizing signal 5, from switch 15, is coupled to an input of phase detector 50 to facilitate synchronization of the second phase locked loop 100. A second input to phase detector 50 is supplied with signal 401, derived by division of voltage controlled oscillator signal 301. The resulting phase error signal 11 is low pass filtered and applied to control VCO 300 thus achieving synchronism with the input video display signal horizontal sync. The third phase locked loop 410 compares a signal from voltage controlled oscillator VCO 300 with a scanning related signal Hrt, for example a horizontal scan derived pulse resulting from a scanning current generated by a scanning amplifier 500.

The center frequency of horizontal oscillator 300 is determined by means of control bus 420, for example an I$^2$C bus, which advantageously changes the oscillator frequency and the low pass filter characteristics. In addition an advantageous protection circuit 600 prevents circuitry damage resulting from accidental, erroneous and undesired divider switching during scanning by means of an electronic interlock.

Operation of the second and third horizontal oscillator loops and scanning amplifier of FIG. 1 is as follows. A horizontal sync signal 5, depicted as an exemplary positive pulse, is selected by switch 15 from either PLL10 or sync signals derived from a plurality of input display signals. Synchronizing signal 5 is applied to a phase detector 50 where it is compared with a horizontal rate signal 401 produced by division of line locked clock signal LLC, 301 from voltage controlled oscillator, VCO 300. Block 400 represents an exemplary deflection processing integrated circuit IC 400, for example type TDA9151. Integrated circuit 400 is bus controlled, for example by I$^2$C bus 420, and also includes a phase detector PLL3, and dividers 415 and 415A. Divider 415A is controlled by signal 402, to provide division ratios of 432 and 864 respectively and thereby produce horizontal rate signals in two bands of frequencies, nominally 1 Fh and 2 Fh. Control signal 402 is coupled to switch 412 which inserts or bypasses divider 415A, to provide two division ratios. Thus voltage controlled oscillator, VCO 300 operates only in a band of frequencies about 13.6 MHz, but is synchronized to horizontal frequencies differing by more than 2:1. Examples of such non-integer related horizontal frequencies are NTSC signals where the horizontal frequency, represented by 1 Fh, is 15,734 kHz and an ATSC 1080I signal with a horizontal frequency, represented relative to the NTSC signal as 2.14 Fh, or 33,670 kHz. During the display of NTSC derived images, switch 412 selects divider 415A which provides a division ratio of 864:1 yielding a frequency nominally that of the NTSC horizontal frequency 1 Fh. Similarly for the display of images with horizontal frequencies of 2 Fh or greater, for example an ATSC 1080I signal, switch 412 bypasses divider 415A resulting in a division ratio of 432 which produces a horizontal frequency 2 Fh, of 31,468 kHz, twice that of the NTSC standard. However, the ATSC 1080I horizontal frequency is not an integer multiple of the NTSC signal 1 Fh and is actually 2.14 times the NTSC frequency. Thus to achieve synchronism with a 1080I input signal, or any non 2 Fh sync rate, requires that the VCO frequency is changed to a frequency which when divided by 432 yields a frequency which may be synchronized with that of ATSC 1080I, or the selected input signal horizontal rate.

Divided line locked clock signal 401 is also coupled to synchronize the third loop 410 by means of phase detector PLL3, which compares clock signal 401 with a scan current derived pulse Hrt, 501. An output signal 403 from PLL3 is coupled via a driver stage 450 to a horizontal scanning stage 500 which generates a scan related current, for example, in a display device or an electron beam deflection coil. In addition to coupling to PLL3, scanning pulse Hrt is also coupled to protection circuit 600 and X-ray protection circuit 690.

As has been described, the operating frequency of the second and third phase locked loops may be changed in the ratio of 2:1 by means of divider switching. However, to achieve synchronization of the VCO at other than harmonically related frequencies, for example with an ATSC 1080I frequency of 2.14 F, or an SVGA signal with an 2.4 Fh horizontal frequency, requires that the second phase locked loop controls the VCO to achieve a non-integer horizontal frequency nominally of between 2.14 and 2.4 times that of an NTSC horizontal frequency. In voltage controlled oscillator 300 an advantageous frequency setting DC potential, FREQ. SET, 302 determines an oscillator frequency which when divided generates a nominal horizontal frequency. The frequency setting DC potential is generated by a digital to analog converter and is applied to a voltage variable capacitor or varicap diode which forms part of the oscillator frequency determining network. The oscillator is synchronized to the input sync signal by means of a phase detector error signal, which is filtered and applied to an inductor which is part of the frequency determining network of VCO 300. In simple terms, a frequency setting DC is applied to the varicap diode end of the series tuned network, with the phase error signal applied at the inductor end. Thus frequency and phase control signals are applied across the frequency determining tuned circuit.

Figure 3:
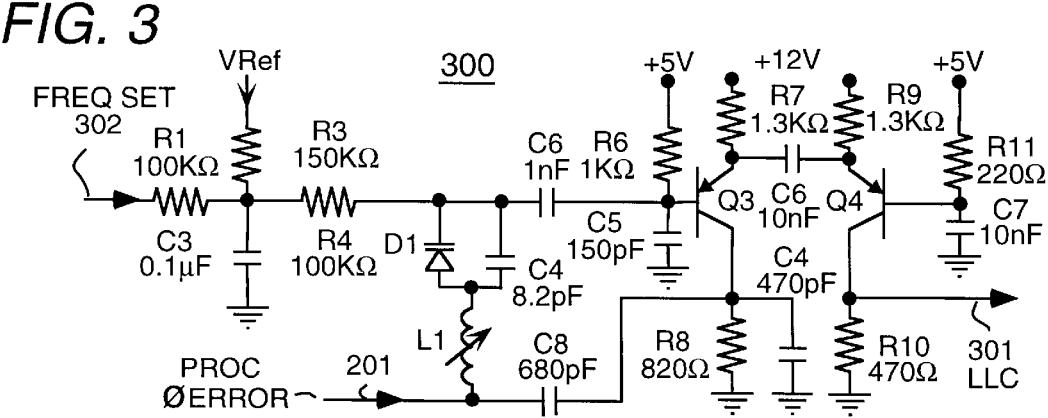
FIG. 3 shows a voltage controlled oscillator including inventive features which form part of FIG. 1.

Voltage controlled oscillator 300 is depicted in FIG. 1 and is shown in schematic form in FIG. 3. Operation of the advantageously controlled oscillator 300 is as follows. Microcontroller 800 and a memory, (not shown), access and output frequency setting data via data bus 420, for example an I$^2$C bus, as illustrated in FIG. 1. The I$^2$C bus is connected to a digital sync processor 400, to provide various control functions, and to a digital to analog converter 700 which separates and converts data into analog voltages. Digital to analog converter 700 generates frequency switching control signal 1H_SW, 701, and VCO frequency setting voltage FREQ. SET 302. In FIG. 3, the frequency setting voltage FREQ. SET 302 is coupled via a resistor R1 to the junction of resistors R3, R4 and a capacitor C3, which in conjunction with resistor R1 forms a low pass filter to ground. Resistors R1 and R3 form a potential divider for the frequency setting voltage with resistor R3 connected to DAC 700 reference voltage (Vref). Thus analog voltage 302 is nominally halved and referenced to the DAC reference voltage (Vref) to apply a nominal voltage of about +3.8 volts of biasing potential to varicap diode D1. The junction of resistors R1, R3 and capacitor C3 are coupled to the cathode of varicap diode D1 via a resistor R4. Thus the nominal DC voltage value, derived from voltage (Vref), plus a data determined frequency setting voltage 302, from ADC 700, are applied to the varicap diode D1 of the oscillator frequency determining network. The frequency setting voltage 302, is nominally zero volts in 1 Fh and 2 Fh modes and rises to about +7 volts when operation at 2.4 Fh, for example SVGA, is selected.

The oscillator is formed by PNP transistor Q3 which has the emitter connected to a positive supply via a resistor R7 and the collector connected to ground via a parallel combination of a resistor R8 and a capacitor C4. The base of transistor Q3 is connected t the positive supply via a resistor R6, and is coupled to ground via a capacitor C5. The oscillator frequency is determined largely by a series resonant network formed by an adjustable inductor L1 and a parallel combination of varicap diode D1 and capacitor C4. The junction of resistor R4, diode D1 cathode and capacitor C4 are coupled to the base of transistor Q3 via capacitor C6. The collector of transistor Q3 is connected via capacitor C8 to the junction of inductor L1 and a resistor, depicted in FIG. 2 as R6, which supplies the processed phase error signal 201 for oscillator synchronization. Thus, the frequency control and the phase synchronization signals are applied across the series resonant network formed by elements D1, C4, L1. Initial tuning of the oscillator may be achieved by setting the DAC voltage 302 to nominally zero volts, and with a 1 Fh horizontal frequency sync signal coupled to the phase detector inductor L1 is adjusted to center the phase detector error signal within its operating range. In an alternative oscillator setting method a fixed non-adjustable inductor L1 is employed. A horizontal frequency sync signal of 1 Fh is applied to the phase detector and DAC voltage 302 is varied until the phase detector error signal is centered. The data value corresponding to this centering value of voltage 302 is then stored. To determine the frequency set voltage for operation at 2.4 Fh, the immediately preceding method is repeated with the data value which centered the loop being stored. The oscillator output signal is extracted from the emitter transistor Q3 at resistor R7 and coupled to the emitter of PNP transistor Q4 via a coupling capacitor C6. Transistor Q4 is configured as a grounded base amplifier with the base decoupled to ground by a capacitor C7 and connected to a positive supply via a resistor R11. The collector of transistor Q4 is connected to ground via resistor R10. Thus the oscillator output signal is developed across resistor R10 and coupled to the sync processing IC 400 as a line locked clock, LLC 301.

Figure 2:
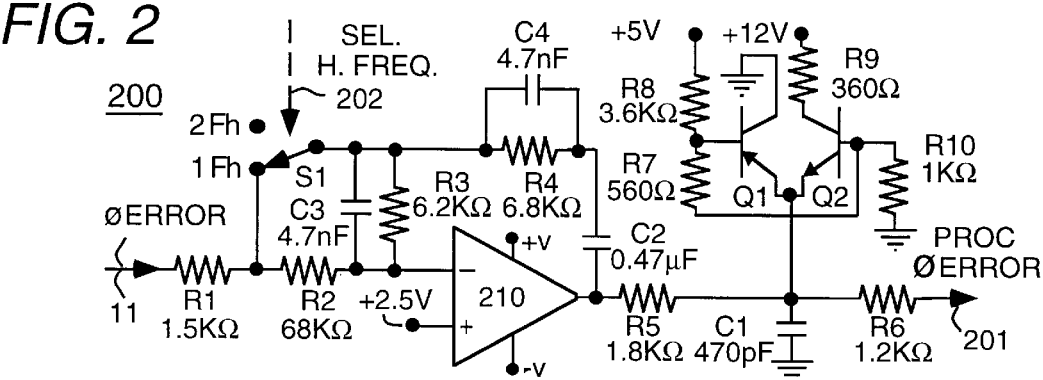
FIG. 2 is a schematic diagram of part of FIG. 1 and shows an inventive switched active filter.

Frequency switching signal SEL. H. FREQ., 202/402 which controls divider 415a selection is also coupled to inventive low pass active filter 200, which is shown in FIG. 2 and functions follows. A phase error signal Φ ERROR, 11, which results from the phase comparison between signal 401, divided VCO, and input signal sync 5, is coupled to input resistor R1. Input resistor R1 is connected in series with resistor R2 to a inverting input of an integrated circuit amplifier 210. The junction of resistors R1 and R2 is connected to a fixed contact 1 Fh of switch S1. The moving contact of switch S1 is connected to the junction of a parallel combination of resistor R3 and capacitor C3 and a parallel combination of resistor R4, and capicitor C4. Negative feedback is applied from the output of amplifier 210 to the inverting input via a frequency dependent network formed by capacitor C2 and series connected combination of parallel networks of resistor R4 and capacitor C4 and resistor R3 and capacitor C3. Parallel network R3, C3 is connected between switch S1 wiper and the inverting input of amplifier 210. When switch S1 selects position 1 Fh, resistor R2 is connected in parallel with the parallel combination of resistor R3 and capacitor C3 with the result that the newly formed parallel network, R2, R3, C3 has little effect in the determination of the amplifier gain or frequency response. Thus when synchronized at 1 Fh, with switch position 1 Fh selected the amplifier gain is set by input resistor R1, with the frequency response determined by capacitor C2 and parallel network R3, C3. When the display is operating at a horizontal frequency greater than 1 Fh switch S1 selects position 2 Fh and resistor R2 becomes the predominant gain determining component, with the frequency response controlled by the series combination of capacitor C2 and parallel networks R3, C3 and R4, C4. The non-inverting input of amplifier 210 is biased to a positive potential of about 2.5 volts.

The output from amplifier 210 is coupled via series connected resistors R5 and R6 to form a processed phase error signal, PROC. Φ ERROR, 201, for coupling to synchronize VCO 300. The junction of resistors R5 and R6 is decoupled to ground by a capacitor C1 which forms a low pass filter to prevent high frequency noise generated, for example by switched mode power supply operation from producing spurious VCO phase modulation. The junction of resistors R5 and R6 is also connected to a peak to peak limiter or clipper formed by the emitters of PNP transistor Q1 and NPN transistor Q2. The collector of transistor Q1 is connected to ground with collector of transistor Q2 connected to a positive supply via a resistor R9. The base of transistor Q2 is connected to the junction of series connected resistors R10 and R7. Resistor R10 is connected to ground and resistor R7 is series connected to a further positive supply via a resistor R8. The junction resistors R7 and R8 is connected to the base of transistor Q1. Thus, resistors R7, R8 and R10 form a potential divider which determines the peak to peak clipping values of approximately +0.3 v and +2.2 volts at which processed error signal 201 is limited.

Figure 5A:
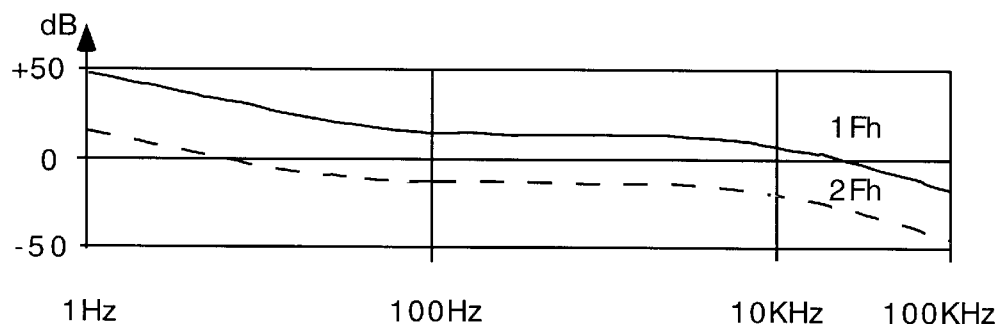
FIG. 5A is a plot illustrating the gain versus frequency characteristic of the inventive switched active filter of FIG. 2.

In a phase locked loop, the selection of phase detector output filtering is a compromise between static and dynamic performance. For example, synchronization to a computer generated SVGA signal may require, or may benefit from, a narrow bandwidth VCO control signal, which will provide a highly phase stable oscillator and horizontal frequency. However, as described previously, VCR replay sync signals may include abrupt horizontal sync phase changes in the vicinity of the vertical sync and vertical blanking intervals. To prevent, or mitigate, the effect of this phase change requires that the loop have a wider bandwidth than required for either computer generated SVGA signals or broadcast signals which are not subject to abrupt phase disturbances. Advantageous amplifier 210 is arranged as an active low pass filter where output signal components are feedback to the inverting input via frequency dependent series connected network C2, C3, C4, and R3, R4. Advantageously switch S1 is controlled responsive to a selected horizontal oscillator frequency such that in switch position 1 Fh, resistor R2 is connected in parallel with parallel combination R3, C3 to form an impedance in series with the inverting input. This parallel combination of resistors R2, R3 and C3 produces little effect on filter gain or frequency response. In switch position 1 Fh the filter gain is determined by the impedance of network C2, C1 and R4 divided by the value of input resistor R1. Clearly as the loop operating frequency approaches DC the impedance of capacitor C2 becomes large and the loop gain approaches an upper limit condition as depicted in FIG. 5A. When operating at other than 1 Fh horizontal frequency switch S1 is controlled to select position 2 Fh. In switch position 2 Fh filter gain is determined by the impedance of feedback network R3, C2, C1 and R4, divided by the series combination of resistors R1 and R2. Since resistor R2 is significantly larger than resistors R3 the gain in the 2 Fh is reduced relative to that of switch position 1 Fh. Thus the active filter gain and bandwidth are controlled to be different in response to a selection of horizontal operating frequency.

Figure 5B:
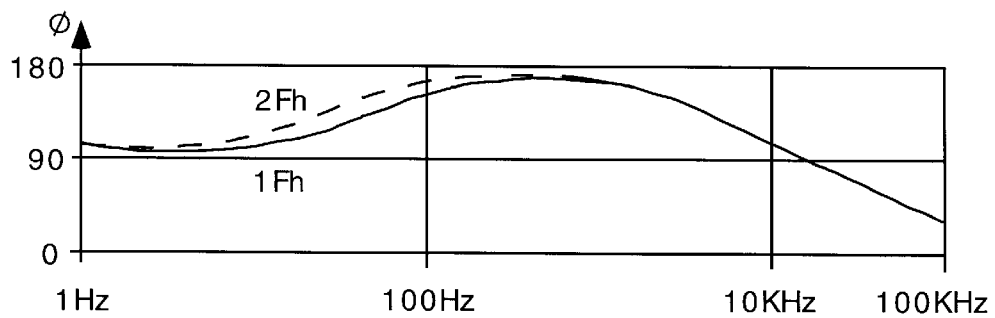
FIG. 5B is a plot illustrating the phase versus frequency characteristic of the inventive switched active filter of FIG. 2.

During operation at a horizontal frequency of 2 Fh or higher, switch S1 selects the 2 Fh position with the result that the gain at frequencies close to DC is approximately 10 dB, as is illustrated by the broken line in the amplitude versus frequency plot of FIG. 5A. The gain then falls to zero at about 10 Hz and continues to fall reaching −20 dB at about 100 Hz. Thus when operating in a 2 Fh mode with switch S1 in the 2 Fh position the zero gain bandwidth is approximately 10 Hz. FIG. 5B shows phase versus frequency plots for the two horizontal frequencies with the 2 Fh mode indicated by a broken line. When operating at an NTSC frequency of 1 Fh, switch S1 is controlled to select the 1 Fh position which increases the filter gain and provides a zero gain bandwidth in excess of 10 kHz. Reference to FIG. 5A illustrates that greater low frequency filter gain is employed during operation at 1 Fh than that used during operation at higher horizontal frequencies. In addition the filter produces a significantly wider phase error signal bandwidth than that obtained in the 2 Fh mode. Active filter gain and frequency response switching is advantageously achieved with a single switch contact which provides savings in printed circuit board area which consequently reduces susceptibility stray field pickup and spurious phase instability.

User input signal selection results in a corresponding selection between the plurality of horizontal frequencies which is communicated by microcontroller 800 to sync source selector switch 15 and sync processing IC 400. Microcontroller 800 generates a specific control command LFSS, which is addressed to sync processing IC 400 to start or stop horizontal and frame generation. Thus horizontal drive output signal, 403, may be terminated by processor 800 control as depicted by output switch 412a. Hence, in the absence of horizontal drive signal 403, horizontal scan amplifier 500 ceases to generate scanning current and consequently pulse Hrt is no longer produced. Following the horizontal off command (LFSS), the microcontroller transmits control words addressed to the digital to analog converter DAC 700. A first DAC 700 control word may represent a horizontal frequency switch command which is output from DAC 700 as analog control signal 1H_SW, 701, and coupled to switching interlock 650. The DAC may also receive a second control word which generates an analog frequency setting potential FREQ. SET 302.

The microprocessor generated command LFSS which turns off horizontal drive 403, consequently terminates generation of pulse Hrt. The absence of pulse Hrt indicates the cessation of scanning which allows control signal 1H_SW to be coupled to form frequency switching signal SEL. H. FREQ. Thus signal SEL. H. FREQ. 402, is able to change state thereby selecting a different division ratio within sync processor 400 and hence a different horizontal frequency for loops 100 and 410. Since scanning is terminated by command LFSS, divider 415A may be inserted or bypassed from the divider chain, without causing damage to the horizontal driver 450 or horizontal scan amplifier 500. The microcontroller transmits the horizontal off command, prior to transmitting a horizontal frequency switch command to ensure that horizontal scanning amplifier 500 is quiescent and thereby avoid circuitry damage. However, an advantageous protection circuit 600 provides a further level of protection by monitoring to determine that digital command LFSS, generated by the microprocessor and transmitted by I²C bus was demultiplexed and implemented by sync processor 400. Thus protection circuit 600 verifies implementation of the bus instruction and allows horizontal frequency selection to occur in the absence of horizontal scan pulses Hrt. In addition sync processor 400 and scanning amplifier 500 are protected against erroneous divider changes resulting from spurious signals generated, for example by, DAC 700, errant circuit functions, power supply loading or CRT arcing.

Figure 4:
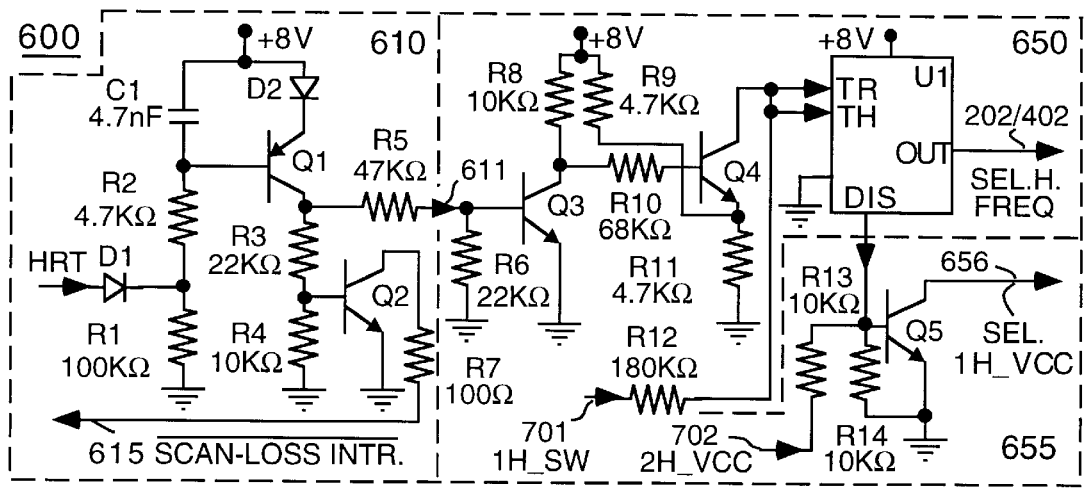
FIG. 4 is a schematic diagram of the inventive switching interlock which forms of part of FIG. 1.

Advantageous protection circuit 600, is shown in FIG. 4, which provides various control functions related to the presence or absence of scanning current as indicated by the detection of pulse Hrt, 501. Circuit block 610, detects the presence or absence of pulse 501 and generates an active low interrupt, SCAN-LOSS INTR. 615, which is coupled to microcontroller, μ CONT. 800.

In a second protective function, circuit 600 verifies that sync processor instruction LFSS has terminated horizontal drive generation as indicated by the absence of pulse Hrt. Thus by interlocking horizontal frequency selection with scanning presence, frequency switching is inhibited in the presence of pulse Hrt. Horizontal frequency selection data is coupled from microcontroller 800 by bus 420. The bus is demultiplexed and the frequency selection data is digital to analog converted by DAC 700 to form switching signal 1H_SW for coupling to circuit block 650. The circuitry of block 650 allows the logical state of signal 1H_SW to be coupled for frequency selection only if scan amplifier 500 is not generating pulses Hrt. Thus horizontal frequency change is interlocked and prevented until scan related pulses cease.

In block 610 of FIG. 4, scan derived pulses Hrt are rectified by diode D1 and charge capacitor C1 positively via a resistor R2 towards the positive supply. The junction of resistor R2 and capacitor C1 are joined to the base of a PNP transistor Q1 with the result that the positive charge developed across capacitor C1 turns the transistor off when deflection related pulses are present. The emitter of transistor Q1 is coupled to a positive voltage supply via a diode D2 which prevents base emitter zenner breakdown and ensures that transistor Q1 turns off when the pulse derived charge across capacitor C1 is approximately 1.4 volts or less. The collector of transistor Q1 is coupled to ground via resistors R3 and R4 connected in series. The junction of the resistors is coupled to the base of an NPN transistor Q2 which has the emitter grounded and the collector coupled via a resistor R7 to form an open collector output signal. Thus when pulses Hrt are present transistor Q1 is turned off, which in turn turns off transistor Q2 rendering output signal 615, scan loss interrupt, an open circuit. When scan related pulses are absent, as a consequence for example, bus derived control function, circuit failure or X-ray protection, the positive charge developed across capacitor C1 is dissipated via the series combination of resistors R1 and R2 thus allowing capacitor C1 to charge towards ground potential. When the potential across capacitor C1 is nominally 1.4 volts transistor Q1 turns on with the collector terminal assuming the nominal potential at the cathode of diode D2. Thus this positive potential of about 7 volts at transistor Q1 collector is applied via the potential divider formed by resistors R3 and R4 to the base of transistor Q2, which turns on taking the collector and output signal 615 to nominal ground potential. Signal 615 is an interrupt signal which, when low, signals microcontroller 800 that scanning current is absent in the exemplary display or coil.

The collector of transistor Q1 of FIG. 4, is also coupled to circuit block 650 which advantageously allows or inhibits changes of horizontal frequency originated by the microcontroller and communicated as a data word via bus 420 to a digital to analog converter DAC 700. The digital to analog converter 700 converts the data word and generates an analog control signal 1H_SW which has two exemplary voltage values. When control signal 1H_SW is nominally at zero volts (Vcesat), divide by two stage of processor 400 is bypassed and divider 415 divides the VCO output signal LLC, 301, by 432 to produce a frequency in a higher band of horizontal frequencies equal to or greater than 2 Fh. When control signal 1H_SW is approximately 9.6 volts, divide by two stage 415A is selected which produces a combined division of 864. Thus the VCO generated line locked clock LLC 301 is divided by 864 to produce a nominal frequency of 1 Fh. The collector of transistor Q1 is coupled via series connected resistors R5 and R6 which form a potential divider to ground. The junction of resistors R5 and R6 is coupled to the base of an NPN transistor Q3 which has a grounded emitter. The collector of transistor Q3 is connected to the positive supply via a load resistor R8 and is also coupled to the base of an NPN transistor Q4 via a resistor R10. The emitter of transistor Q4 is coupled to the junction of a potential divider formed between the positive supply and ground where resistor R9 is connected to the supply and resistor R11 is connected to ground. Thus, the emitter of transistor Q4 is biased at about 4 volts. Hence transistor Q4 is turned on when the base voltage exceeds about 4.7 volts causing the collector to assume the nominal emitter potential. The collector of transistor Q4 is connected directly to the junction of control signal 1H_SW, and both the trigger input TR and threshold the threshold input of input TH of integrated circuit U1, for example I.C. type LMC 555. Thus with both the trigger and threshold inputs clamped to 4 volts, changes in control signal 1H_SW resulting from bus generated command or erroneous signal pickup are prevented from changing the output state of I.C. U1. The threshold input of integrated circuit U1 responds when voltage value of control signal 1H_SW exceeds about 5.3 volts and results in the selection of 1 Fh scanning frequency. The trigger input of I.C. U1 responds to a negative transition of control signal 1H_SW when the voltage value is less than approximately 2.6 volts which results in the selection of 2 Fh scanning frequency.

Operation of circuit 650 is as follows. The presence of Hrt pulses coupled to circuit 610 turns off transistor Q1 with the collector assuming a nominally ground potential via the parallel combination of series connected resistors R3 and R4, and series connected resistors R5 and R6. Thus, transistor Q3 is also turned off with the collector assuming the nominal supply voltage via resistor R8. This positive potential is applied to the base of transistor Q4 which turns on connecting the junction of control signal 1H_SW and integrated circuit U1 to a potential of about +4 volts. With +4 volts applied to both the trigger and threshold inputs of IC U1, U1 is prevented from responding to changes of control signal 1H_SW. Thus the current status of select horizontal frequency control signal 202/402 is maintained and cannot be changed whilst scanning pulses Hrt are present. In the absence of scanning pulses transistor Q1 turns on and the collector assumes the nominal supply potential. This positive potential is coupled via series resistors R5 and R6 and turns on transistor Q3 which in turn, turns off transistor Q4. With transistor Q4 off, the inhibit is removed from integrated circuit U1 thus, for 1 Fh operation signal 1H_SW assumes a high voltage value, and IC U1 assumes a low voltage value. Similarly when 2 Fh operation is selected control signal 1H_SW assumes a low voltage with U1 output assuming a high voltage value. Thus, change of horizontal frequency is prevented when scan related pulses Hrt are present, thereby preventing probable failure of horizontal scanning stage 500.

In circuit block 655 of FIGS. 1 and 4, integrated circuit U1 advantageous provides a further protective function by controlling power supply selection to ensure that a higher voltage power supply is enabled only when horizontal scanning frequencies of 2 Fh or greater are selected. In addition circuit 655 prevents unwanted control instructions or spurious signals from enabling the higher voltage supply during scanning at standard definition rates. Such erroneous activation of the higher voltage canning supply causes probable destruction of scanning amplifier 500.

In FIG. 4, a power supply switching command 2H_VCC, from DAC 700, is coupled to series connected resistors R13 and R14 which form a potential divider to ground. The junction of the resistors is connected to the base of a transistor Q5 which has the emitter grounded and the collector connected as an open collector output to generate power supply control signal SEL. 1H_VCC, 656. The base of a transistor Q5 is also connected to a discharge output of I.C. U1. The operation of circuit block 655 is as follows. In response to selection of scanning frequencies of 2 Fh or greater, a power supply enabling command is generated by microcontroller 800 and transmitted by bus 420. The power supply enabling command is demultiplexed by digital to analog converter DAC 700 which generates a power supply control signal 2H_VCC, 702. When control signal 702 is high, for example, approximately +9.6 volts transistor Q5 is turned on and the collector, and power supply control signal SEL. 1H_VCC, 656 assumes a potential of nominally zero volts, (Vcesat) of transistor Q5. Thus with power supply control signal 656 low, a higher voltage supply is enabled for scanning operation at higher horizontal frequencies. However enablement of the higher voltage power supply is advantageously controlled or interlocked to prevent erroneous activation of the higher voltage power supply during scanning at NTSC rates. Such erroneous power supply enablement generates excessive scanning current, increases retrace pulse Hrt amplitude, and consequently causes failure of scanning amplifier 500.

Transistor Q5 is advantageously controlled by a discharge output circuit of IC U1 which assumes a saturated, low impedance state during scanning operation at NTSC rates. Thus the discharge output circuit of IC U1 prevents erroneous high voltage supply activation by clamping transistor Q5 base to nominal ground potential during scanning at 1 Fh rates, inhibiting generation of signal 2H_VCC. Thus enablement of the higher voltage power supply is prevented and signal SEL. 1H_VCC, 656 remains high, sustaining a 1 Fh power supply condition having a lower operating voltage. The discharge circuitry of I.C. U1 becomes inactive when the output circuitry of U1 changes state, i.e. output signal SEL H. Freq. goes high in response to the selection of a 2 Fh operating mode.

The inventive interlock between horizontal frequency selection and scanning presence advantageously verifies implementation of bus transmitted instruction. In addition circuit damage is averted by the inventive circuit which prevents erroneous horizontal frequency switching or power supply activation.

What is claimed is:

1. A scanning generator operable at a plurality of horizontal scanning frequencies, comprising:
    an oscillator generating a signal;
    a divider with at least two selectable counts, coupled to said oscillator and dividing said signal by a first count to generate a horizontal drive signal;
    a horizontal scanning amplifier generating a scanning signal responsive to said horizontal drive signal; and,
    a controller coupled to said scanning amplifier and to said divider,
    wherein, responsive to a selection of another one of said plurality of horizontal scanning frequencies, said controller monitors to determine a presence of said scanning signal, and responsive to said presence, said controller inhibits selection of a second of said least two selectable counts, and absent said presence of said scanning signal, said controller enables selection of said second of said least two selectable counts and said divider generates a horizontal drive signal representative of said another one of said plurality of horizontal scanning frequencies.

2. The scanning generator of claim 1, wherein said oscillator is synchronized by a synchronizing signal representative of a selected one of said plurality of horizontal scanning frequencies.

3. The scanning generator of claim 1, wherein said absence of said scanning signal represents horizontal scanning amplifier quiescence.

4. The scanning generator of claim 1, wherein said scanning signal corresponds to a retrace pulse occurring during a scan retrace period.

5. The scanning generator of claim 1, wherein said controller includes a latching circuit with an input triggered by a frequency selecting signal and inhibited by clamping said input to a low impedance.

6. A video display operable at a plurality of scanning frequencies, comprising:
    a scanning generator generating a scanning signal at selectable ones of said plurality of horizontal frequencies responsive to data bus control;
    a protection circuit coupled said scanning generator; and,
    a controller responsive to user control and coupled to said protection circuit and to said data bus to control said scanning generator,
    wherein said user control selects another one of said plurality of scanning frequencies, and responsive thereto said controller transmits a control data word representative of scanning cessation, said protection circuit monitors said scanning signal and upon compliance with said control data word said protection circuit allows selection of said another one of said plurality of scanning frequencies, absent said compliance with said control data word said protection circuit inhibits selection of said another one of said plurality of scanning frequencies.

7. The video display of claim 6, wherein said scanning signal is a scanning retrace pulse.

8. The video display of claim 6, wherein selection of said another one of said plurality of scanning frequencies is enabled when said scanning signal generator is quiescent.

9. A video display operable at multiple scanning frequencies, comprising:
    a scanning generator selectably generating scanning signals at a first and a second horizontal frequency;
    a power supply controllably generating a supply voltage for energizing said scanning generator;
    a protection circuit coupled to said scanning generator and said power supply; and,
    a controller responsive to user control and coupled to said scanning generator to select one of said first and a second horizontal frequencies, and to said power supply to control activation responsive to selection of said second horizontal frequency,
    wherein, upon selection of said second scanning frequency said controller controllably selects generation of said scanning signals at said second frequency and controllably activates said power supply to energize said scanning generator for generating said scanning signals at said second frequency, said protection circuit monitors for said controllable selection and responsive thereto said protection circuit enables said controllable activation of said power supply, absent said controllable selection of said second frequency, said protection circuit inhibits said control activating said power supply.

10. The video display of claim 9, wherein said controller generates a first data word for demultiplexing and digital to analog conversion to generate a first control signal for controllably activating said power supply.

11. The video display of claim 10, wherein said controller generates a second data word for demultiplexing and digital to analog conversion to generate a second control signal for controllably selecting generation of said scanning signal at said second horizontal frequency.

12. The video display of claim 11, wherein said protection circuit monitors said second control signal for controllably selecting generation of said scanning signal at said second horizontal frequency and responsive thereto protection circuit enables coupling of said first control signal to activate said power supply.

* * * * *